United States Patent Office 3,784,519
Patented Jan. 8, 1974

3,784,519
CATALYST COMPOSITION FOR THE PRODUCTION OF TRIOXANE POLYMERS
Albrecht Hilt, Ludwigshafen, and Franz Schmidt and Erich Schwartz, Mannheim, Germany, assignors to Badische Anilin- & Soda-Fabrik Aktiengesellschaft, Ludwigshafen (Rhine), Germany
No Drawing. Original application Apr. 15, 1970, Ser. No. 28,956, now abandoned. Divided and this application Jan. 17, 1972, Ser. No. 218,461
Claims priority, application Germany, Apr. 18, 1969, P 19 19 744.5
Int. Cl. C08g 1/20
U.S. Cl. 260—67 FP                10 Claims

ABSTRACT OF THE DISCLOSURE

A process for polymerizing trioxane with a special catalyst composition based on a blend of hydrofluoric acid and fluoboric acid.

---

This application is a divisional of the now abandoned application Ser. No. 28,956, which was filed on Apr. 15, 1970.

This invention relates to a special catalyst composition for the production of trioxane polymers.

British Pat. No. 878,163 discloses a method of manufacturing polyoxymethylenes by polymerizing trioxane with the aid of electrophilic catalysts. If trioxane is polymerized in the presence of suitable copolymerizable compounds such as cyclic ethers or acetals having at least two vicinal carbon atoms or certain polyacetals or unsaturated compounds, there are obtained copolymers which contain a certain number of hydroxyalkylene groups randomly distributed in the polyoxymethylene chain. These copolymers have the advantage over the homopolymers that they show greater thermal stability and that therefore they normally do not require "chain end capping" as is usual for the homopolymers.

A large number of catalysts have been proposed for the cationic homopolymerization or copolymerization of trioxane, but only a few are used in practice. A frequently used catalyst is boron trifluoride, generally in the form of complex compounds with ethers. British Pat. Nos. 1,067,763 and 983,201 also describe the use of fluoboric acid as a catalyst. U.S. Pat. No. 2,795,571 also proposes the use of hydrogen fluoride as catalyst; relatively large quantities of catalyst must be used, however, despite high polymerization temperatures and long reaction times.

Polymers of trioxane are preferably manufactured in substance, the catalyst being generally added, if desired in the form of a solution, to a melt of the monomer or monomers. The resulting polymer is insoluble in the monomer at the usual polymerization temperatures of from 60° to 140° C., particularly from 65° to 120° C., and with the usual amounts of comonomer, and it is therefore obtained either as a solid block of polymer or, where polymerization is carried out under the influence of shearing forces, as a powdered or granular substance. The polymerization or precipitation of polymer begins after a certain induction period, the length of which, for a given purity of monomer, depends on the nature and amount of the comonomers and of the catalyst used and is generally of the order of a few seconds.

It is a drawback of catalysts previously used in the copolymerization of trioxane in substance that, for a given monomer mixture and a given amount of catalyst necessary to achieve the desired reaction rate, the duration of the induction period and the maximum possible conversion are virtually invariable. For this reason the use of systems having short induction periods, for example catalysts systems consisting of $BF_3$ or fluoboric acid in conjunction with small amounts of comonomer, makes it very difficult to achieve intimate mixing of the catalyst in the time available and polymerization is uneven. Furthermore, the mixture containing the catalyst are difficult to convey to the polymerization vessel. If the induction period is lengthened, for example by reducing the amount of catalyst incorporated, the space-time yield of the polymerization reaction drops steeply and it is unlikely that substantial conversion of the monomers will occur. When hydrogen fluoride or aqueous hydrofluoric acid is used as catalyst, the induction period is very long and extremely poorly reproducible. In many cases no polymerization occurs at all at polymerization temperatures of from about 65° to 80° C.

Another drawback of the previously used catalysts, and particularly of the strongly acid catalysts, in that the resulting crude polymers are difficult to work up subsequently, as they tend to degrade when stored in contact with catalyst residues still present therein. Their viscosity is reduced due to chain cleavage and increasing amounts of thermally unstable portions are formed.

We have now found that a catalyst composition for use in the production of polymers of trioxane suffers from the above disadvantages not at all or to a greater reduced extent when it contains from $5\times10^{-5}$ to 1 mole and preferably from $5\times10^{-5}$ to 0.05 mole of fluoboric acid per mole of hydrogen fluoride.

Catalyst compositions of the kind stated and containing small amounts of fluoboric acid are particularly suitable for the production of copolymers of trioxane in substance, the length of the induction period being variably controlled within certain limits without detriment to the conversion and polymerization rate achieved. Preferred comonomers are cyclic ethers, such as ethylene oxide, and in particularly cyclic acetals, such as 1,4-dioxolane, 1,3-dioxane and 1,3-dioxyacycloheptane, and linear polyacetals derived from the said cyclic acetals or derived from the condensations of dihydric alcohols with formaldehyde. However, the catalyst composition of the invention is also suitable for the copolymerization of trioxane with other copolymerizable compounds, for example with unsaturated compounds or with substances containing a number of copolymerizable ether or acetal groups in the molecule and thus provide branched or cross-linked polymers. The comonomers are generally used in quantities such that the resulting polymers contain from 0.1 to 25% molar and preferably from 0.25 to 10% molar of alkylene oxide groups in addition to the oxymethylene groups.

The components of the catalyst composition may be added separately to the mixture to be polymerized or they may be added together, preferably in the form of a solution in suitable solvents, for example in ethers or, if desired, in comonomers. The catalyst may be prepared by known methods. For example, hydrogen fluoride may be used in the form of a commercial aqueous solution ("hydrofluoric acid") or alternatively, solutions of hydrogen fluoride in, say, ethers such as diethyl ether, dibutyl ether, dioxolane, 1,3-dioxacycloheptane, etc. may be used. Fluoboric acid may be used as such, for example in the form of a concentrated aqueous solution, or it may be produced in the solution of hydrogen fluoride by the reaction of suitable compounds of boron, for example boric acid or boron trifluoride, with hydrogen fluoride.

The homopolymerization or copolymerization of trioxane using the catalyst composition of the invention is preferably carried out in substance and the procedure is fundamentally the same as in a process of the art. We have found, however, that many advantageous methods may be utilized to the full due to the precise control of kinetic reaction parameters now possible.

In the preferred embodiment of copolymerization of trioxane in substance, for example in multiple compartment molds or in equipment having shearing and conveyig means, the total amount of the catalyst composition of the invention which is used is generally less than 0.05%, preferably less than 0.025% and more preferably less than 0.015% of the mixture of monomers. The said total amount depends, on the one hand, on the particular method adopted and, on the other hand, on the ratio of the two components of the catalyst system to each other.

To achieve a certain space-time yield on reducing the amount of fluoboric acid used, the amount of hydrogen fluoride will generally be increased to such an extent that, for example, when the amount of fluoboric acid is reduced to about one tenth the total amount of catalyst is increased to about four or five times. For example, in the copolymerization of 97% of trioxane with 3% of 1,3-dioxolane in multiple compartment molds a conversion of about 85 to 88% is achieved in about 25 minutes with each of the following catalyst composition (quantities given in p.p.m. of the monomer mixture):

| Catalyst component | Amount (in p.p.m. of the monomer mixture) | | | |
|---|---|---|---|---|
| $HBF_4$ | 2 | 1.5 | 1 | 0.5 |
| HF | 10 | 15-20 | 20-30 | 30-40 |
| Total | 12 | 20 | 25 | 35 |

The most favorable values are readily determined by experiment, as illustrated below.

When the individual components are used alone in the amounts stated, the conversion obtained is much lower where polymerization occurs (if at all).

In the following, the percentages are by weight. The determination of the K value, which is a measure of the degree of polymerization, is carried out by viscosity measurements after Fikentscher, Cellulosechemie, 13, 58 (1932), wherein 0.25% solutions in a mixture of phenol and o-dichlorobenzene (3:2) are measured with 2%-pinene at a temperature of 100° C.

EXAMPLES 1 TO 4

2,200 g. of a liquid mixture of 97% of trioxane, 2.85% of 1,3-dioxacycloheptane and 0.15% of butylal at 65° C. and the amounts of $HBF_4$/HF blends given in the table in the form of approximately 0.1% solutions in a mixture of dibutyl ether and benzene are poured through a mixing funnel into a multiple compartment mold havig a layer thickness of 3 cm., a length of 35 cm. and a height of 30 cm. and tempered at 60° C. by means of a circulating thermostat and a heating jacket, and the said liquids are then thoroughly mixed.

After the induction period has elapsed the mixture becomes turbid and solid. The block is removed from the mold 15 minutes after the commencement of turbidity and is allowed to stand for 60 minutes in air for cooling. It is then crushed and milled. To remove the unconverted moomers, the milled material is treated with boiling aqueous methanol containing soda for 1 hour with stirring. The polymer is filtered off, washed with water and dried at 80° C. in vacuo. The degree of conversion, the stable portion and the K-value of the polymer are determined:

TABLE 1

| Experiment | P.p.m. of monomer $HBF_4$ | HF | Induction period (seconds) | Yield (in percent of monomers) | Stable portion of polymer (percent) | K-value of polymer |
|---|---|---|---|---|---|---|
| Comparative | 0 | 100 | 600 | 0 | 0 | 0 |
| 1 | 0.2 | 60 | 90 | 78.2 | 95.9 | 74.7 |
| 2 | 0.5 | 40 | 60 | 80.4 | 96.2 | 75.5 |
| 3 | 1.0 | 30 | 45 | 80.7 | 96.3 | 74.9 |
| 4 | 2.0 | 15 | 35 | 80.5 | 96.0 | 75.2 |
| Comparative | 2.5 | 0 | 250 | <50 | 0 | 0 |
| Do | 10.0 | 0 | 32 | 79.4 | 94.8 | 73.5 |
| Do | 5.0 | 0 | 65 | 64 | 0 | 0 |

EXAMPLES 5 TO 8

The procedure of Examples 1 to 4 is repeated except that 1,3-dioxacycloheptane is replaced by an equal weight of 1,3-dioxolane. The catalyst combinations and results of polymerization are given in Table 2 below.

TABLE 2

| Experiment | P.p.m. of monomer $HBF_4$ | HF | Induction period (seconds) | Yield (in percent of monomers) |
|---|---|---|---|---|
| Comparative | 0 | 100 | (¹) | (¹) |
| 5 | 0.1 | 70 | 75 | 86.2 |
| 6 | 0.2 | 50 | 50 | 84.6 |
| 7 | 0.5 | 40 | 25 | 87.4 |
| 8 | 1.0 | 25 | 15 | 86.6 |

¹ No polymerization took place.

The polymers have stable portions of 95.5 to 97% and K values of from 76 to 78.

COMPARATIVE EXPERIMENTS

Copolymers of trioxane with 1,3-dioxacycloheptane and with 1,3-dioxolane are prepared as in Examples 1 to 4 and 5 to 8 respectively except that the polymerization catalyst used is the frequently employed catalyst boron fluoride di-n-butyl etherate. The results are given in the following table.

TABLE 3

| Comparative experiemrnt number: | Comonomer | Amount of catalyst (in p.p.m. of monomers) | Induction period (seconds) | Yield (in percent of monomers) |
|---|---|---|---|---|
| 1 | 1,3-dioxacycloheptan | 35 | 35 | 79.4 |
| 2 | 1,3-dioxacycloheptan | 25 | 43 | 76.0 |
| 3 | 1,3-dioxacycloheptan | 20 | 60 | 64.0 |
| 4 | 1,3-dioxacycloheptan | 15 | 90 | 52.3 |
| 5 | 1,3-dioxolan | 25 | 15 | 87.4 |
| 6 | 1,3-dioxolan | 15 | 20 | 68.2 |
| 7 | 1,3-dioxolan | 10 | 80 | 39.5 |

It will be seen from these comparative experiments that the yield of copolymer falls steeply when the induction period is increased by reducing the amount of $BF_3$-dibutyl etherate. Furthermore, those copolymers made with long induction periods show, surprisingly, exceptionally high contents of unstable portions, these being at from 6 to 8%. By comparison, these drawbacks do not occur when the process is worked using the catalyst compositions of the invention (see Tables 1 and 2).

We claim:

1. In a process for polymerizing trioxane or copolymerizing a major amount of trioxane with an oxygen containing comonomer whereby a moldable product is formed, the improvement which comprises: carrying out said polymerization or copolymerization of trioxane in the presence of a catalyst consisting essentially of fluoboric acid and hydrogen fluoride in a ratio of $5 \times 10^{-5}$ to 1 mole of fluoboric acid per mole of hydrogen fluoride.

2. A process as in claim 1 wherein the ratio of fluoboric acid to hydrogen fluoride is from $5 \times 10^{-5}$ to 0.05 mole of fluoboric acid per mole of hydrogen fluoride.

3. A process as in claim 2 wherein said trioxane is copolymerized with an oxygen containing member selected from the group consisting of a cyclic ether, a cyclic acetal and a linear polyacetal derived from said cyclic acetal or derived from the condensations of dihydric alcohols with formaldehyde and wherein said copolymerized member is employed in a quantity such that the resulting copolymers contain from 0.1 to 25% molar of alkylene oxide groups in addition to oxymethylene groups.

4. A process as in claim 3 wherein said copolymerized member is 1,3-dioxolane.

5. A process as in claim 3 wherein said copolymerized member is 1,3-dioxane.

6. A process as in claim 3 wherein said copolymerized member is 1,3-dioxacycloheptane.

7. A process as in claim 3 wherein said copolymerized member is ethylene oxide.

8. A process as in claim 2 wherein the amount of said catalyst is less than 0.05% by weight based on the weight of polymerized or copolymerized monomers.

9. A process as in claim 2 wherein said polymerization or copolymerization is carried out at a temperature of from 60 to 140° C.

10. A process as set forth in claim 2 wherein said polymerization or copolymerization is carried out at a temperature of from 65 to 120° C.

References Cited

UNITED STATES PATENTS

| | | | |
|---|---|---|---|
| 2,795,571 | 6/1957 | Schneider | 260—67 FP |
| 3,200,096 | 8/1965 | Hudgin et al. | 260—67 FP |
| 3,357,953 | 12/1967 | Baumber | 260—67 FP |

FOREIGN PATENTS

| | | | |
|---|---|---|---|
| 1,067,763 | 5/1967 | Great Britain | 260—67 FP |

WILLIAM H. SHORT, Primary Examiner

L. M. PHYNES, Assistant Examiner

UNITED STATES PATENT OFFICE
CERTIFICATE OF CORRECTION

Patent No. 3,784,519   Dated January 8, 1974

Inventor(s) Albrecht Hilt et al

It is certified that error appears in the above-identified patent and that said Letters Patent are hereby corrected as shown below:

Column 2, line 37, "1,3-dioxyacycloheptane" should read -- 1,3-dioxacycloheptane --.

Column 3, line 73, "havig" should read -- having --.

Column 4, line 8, "moomers" should read -- monomers --.

Column 4, Table 1, line 15, column 2, "monomer" should read -- monomers --.

Column 4, Table 2, line 33, column 2, "monomer" should read -- monomers --.

Column 5, line 8, "mole", 1st. occ. should read -- moles -- .

Column 2, line 36, "1,4-dioxolane" should read --1,3-dioxolane--.

Signed and sealed this 29th day of October 1974.

(SEAL)
Attest:

McCOY M. GIBSON JR.
Attesting Officer

C. MARSHALL DANN
Commissioner of Patents